| United States Patent [19] | [11] | 4,108,923 |
|---|---|---|
| Mast et al. | [45] | Aug. 22, 1978 |

[54] POLY(METHYL METHACRYLATE) COMPOSITION

[75] Inventors: William C. Mast, Stow; Richard G. Bauer, Kent; Tom M. Wathen, Akron, all of Ohio

[73] Assignee: The Goodyear Tire & Rubber Company, Akron, Ohio

[21] Appl. No.: 612,134

[22] Filed: Sep. 10, 1975

Related U.S. Application Data

[63] Continuation of Ser. No. 486,149, Jul. 5, 1974, abandoned.

[51] Int. Cl.$^2$ .................... C08L 63/00; C08L 51/00
[52] U.S. Cl. .................... 260/836; 260/876 R; 260/881; 260/885; 260/886
[58] Field of Search .................... 260/836, 837, 876 R, 260/881, 885

[56] References Cited

U.S. PATENT DOCUMENTS

| 2,539,376 | 1/1951 | Staudinger et al. | 260/885 |
|---|---|---|---|
| 3,475,516 | 10/1969 | Bauer et al. | 260/876 R |
| 3,637,559 | 1/1972 | Pinkney | 260/885 |
| 3,812,205 | 5/1974 | Dunkelberger | 260/885 |
| 3,833,682 | 9/1974 | Dickie et al. | 260/836 |
| 3,914,338 | 10/1975 | Krieg et al. | 260/876 R |
| 3,943,190 | 3/1976 | Abe et al. | 260/876 R |
| 3,988,392 | 10/1976 | Kameda | 260/876 R |
| 3,992,486 | 11/1976 | Lang | 260/885 |

*Primary Examiner*—Paul Lieberman
*Attorney, Agent, or Firm*—H. C. Young, Jr.

[57] ABSTRACT

An impact resistant poly(methyl methacrylate) composition which comprises a solid external phase and a discrete microdispersed solid internal phase with refractive indices in the range of about 1.45 to about 1.55. Said composition is prepared by polymerizing methyl methacrylate monomer, co-monomer mixture or sirup thereof in the presence of a microdispersion therein of a cross-linked graft polymer prepared by copolymerizing a mixture of acrylic or methacrylic ester, selected vinyl substituted monomer and a selected polyfunctional monomer. The composition of this invention can be particularly suitable for use where clear sheet glass is used and where a clear plastic material is desired having good impact strength and optical properties.

2 Claims, No Drawings

POLY(METHYL METHACRYLATE) COMPOSITION

This is a continuation, of application Ser. No. 486,149 filed July 5, 1974.

This invention relates to an impact resistant composition and to a method for its preparation. The invention particularly relates to high impact strength, transparent resinous materials prepared from methyl methacrylate and a graft polymer.

Poly(methyl methacrylate) has long been used in various applications where plastics are needed having a degree of optical clarity. Such a poly(methyl methacrylate) resin itself has a serious heat degradable characteristic in that it tends to depolymerize upon the application of heat. Therefore, it is typically prepared by copolymerizing a small amount of a comonomer with methyl methacrylate in order to inhibit depolymerization.

However, even such a heat-age resistant copolymer of poly(methyl methacrylate) has its own serious disadvantages relating to a fairly substantial lack of impact resistance for many purposes. In other words, it has a tendency to shatter when impacted with sharp blows. Various methods have been used to improve the impact resistance of such resins. For example, such resins have been prepared by latex coagulation with rubbery materials or by simple dry blending of the resin with rubbery materials or various polymeric materials.

Due to the relatively high proportion of polymer required to achieve acceptable strength by these blending methods (35–50% by the dry blending method, and 25–35% by the latex blend method) the valuable modulus, optical properties and heat distortion temperatures are significantly reduced and increased deformation under load occurs, in contrast to the original poly(methyl methacrylate).

Therefore, it is an object of this invention to provide a transparent resin derived from methyl methacrylate having an improved impact resistance while retaining other desirable properties.

In accordance with this invention, an impact resistant composition is provided which comprises a solid external phase and a discrete microdispersed solid internal phase, said external and internal phases having individual white light refractive indices within about 1 percent of each other in the range of about 1.45 to about 1.55 at 23° C, prepared by the method which comprises free radical polymerizing, at a temperature in the range of about 35° C to about 85° C, (A) 100 parts by weight of a liquid external phase dispersant selected from methyl methacrylate, methyl methacrylate-comonomer mixture and a sirup of a partial polymerization thereof, which comprises about 50 to about 100 weight percent methyl methacrylate, and, correspondingly, about 50 to about zero weight percent of at least one vinyl substituted co-monomer in the presence of (B) about 2 to about 15 parts by weight of a microdispersion therein of a cross-linked graft polymer having a particle size in the range of about 0.05 to about 20 microns, where said co-monomer of said dispersant is a vinyl substituted monomer characterized by being soluble in and free radical addition polymerizable with methyl methacrylate and by being a non-solvent for said cross-linked graft polymer and where said cross-linked graft polymer is typically thermoplastic and is the product of free radical copolymerizing a mixture which comprises (1) about 92 to about 99.9 weight percent of a mixture comprising about 50 to about 99 weight percent monomers selected from acrylic esters, methacrylic esters, and correspondingly, about 1 to about 50 weight percent of at least one vinyl substituted monomer whose polymer has a white light refractive index at 23° C in the range of about 1.5 to about 1.6, and, correspondingly, (2) about 0.1 to about 8 weight percent of a polyfunctional monomer selected from divinylbenzene, allyl methacrylate, glycidyl acrylate, glycidyl methacrylate, triallyl cyanurate, 1,3-butylene dimethacrylate and ethylene glycol dimethacrylate. Representative of said vinyl substituted monomers whose polymers have a white light refractive index at 23° C in the range of about 1.5 to about 1.6 are styrene, α-methylstyrene, o, m and p methyl styrene, acrylonitrile and methacrylonitrile.

The composition of this invention can typically be characterized by having a white light transmission efficiency in the range of about 85 to about 92 percent, a notched Izod impact strength in the range of about 8 to about 30 in. lbs, a flex modulus in the range of about 200,000 to about 300,000 psi, a Shore D hardness in the range of about 75 to about 85, a tensile strength in the range of about 3000 to about 5000 psi, a haze value in the range of about 2 to about 10 percent and a heat distortion temperature in the range of about 180° C to about 220° C (66 psi).

In the preferred practice of this invention, the clear impact resistant composition, or resin, is prepared by reacting in the presence of a free radical initiator 100 parts methyl methacrylate or a comonomer mixture, or a partially polymerized sirup thereof, and about 3 to about 7 parts by weight of the graft polymer. It is generally preferred that such acrylate-comonomer mixture comprises about 80 to about 98 weight percent methyl methacrylate and, correspondingly, about 20 to about 2 weight percent of said co-monomers. In most instances, a partially polymerized sirup thereof is preferred. A more preferred particle size for the graft polymer is in the range of about 0.1 to about 10 microns.

In the practice of this invention, various other vinyl substituted co-monomers can be used with methyl methacrylate which will undergo a free radical addition polymerization. Representative of such vinyl substituted co-monomers are acrylic esters, styrene, vinyl toluene, t-butyl styrene, mono, di and trichlorostyrenes, α-methylstyrene, o, m and p-monoethyl styrene, acrylonitrile, methacrylonitrile, acrylic acid, methacrylic acid and N,N'-dimethyl acrylamide, particularly preferred are acrylic esters, methacrylic esters, styrene, vinyl toluene, acrylonitrile and methacrylonitrile.

Representative of the various acrylic esters are compounds having the general structure

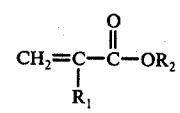

where $R_1$ is selected from hydrogen, methyl and ethyl radicals, preferably hydrogen and methyl radicals and where $R_2$ is essentially selected from saturated alkyl radicals having 1 to 20 carbon atoms, aryl radicals having 6 to 30 carbon atoms and alkoxy radicals having 1 to 20 carbon atoms, although minor amounts, up to about 20 mole percent based on the total $R_2$, of modifying radicals for the purpose of adding specific physical properties such as heat and solvent resistance and mechanical properties. Alkyl radicals with 1 to 4 carbons are preferred for $R_2$. Representative of such alkyl radicals are methyl, ethyl, n- and i-propyl, n-, s- and t-butyl, amyl, hexyl, 2-ethylhexyl, octyl, nonyl, decyl, cyclohexyl and tridecyl radicals. Representative of alkoxy radicals are ethoxy and 2-methoxy radicals. Representative of aryl radicals are phenyl radicals. Representative of modifying radicals include hydroxypropyl, stearyl, lauryl, isobornyl, bromoethyl, methylthiol, dimethylaminoethyl, t-butyl aminoethyl, 2-hydroxyethyl, isocyanatoethyl, 2(diethylphosphato)ethyl, 1-diethylphosphonoethyl and 2-sulfoethyl radicals.

In the description of this invention, said liquid reactive dispersant can be a sirup of the partially polymerized monomers. In this instance, the term sirup relates to such monomers when they have been up to about 25 percent reacted or polymerized to create a viscous liquid which is a mixture of polymer and unreacted monomers.

For the preparation of the graft polymer, the various well-known free radical initiators, or free radical generating catalysts, can be used. Representative of such initiators are persulfates, such as ammonium, sodium and potassium persulfate, and peroxides such as benzoyl peroxide, lauroyl peroxide, t-butyl peroxypivalate, chlorobenzoyl peroxide; percarbonates such as di(2-ethylhexyl) peroxydicarbonate, di(sec butyl) peroxydicarbonate and diisopropyl peroxydicarbonate, t-butyl perbenzoate and hydroperoxides such as t-butyl hydroperoxide, paramenthane hydroperoxide, diisopropyl benzene hydroperoxide and cumene hydroperoxide. Generally preferred radical generating catalysts are potassium persulfate, benzoyl peroxide, lauroyl peroxide and t-butyl peroxypivalate. The preparation of the graft polymer can be conducted on an aqueous emulsion or dispersion basis, if desired.

For the preparation of the impact resistant composition of this invention, the reactants can be all mixed together to which the free radical initiator is added and the mixture allowed to bulk polymerize at a temperature in the range of about 35° to about 85° C for about 0.5 to about 10 hours depending primarily upon the reactants used. In an alternative, and generally preferred method, the methyl methacrylate, monomer mixture, or sirup thereof, are mixed together with a free radical initiator and allowed to bulk polymerize to an extent characterized by a viscosity in the range of about 200 to about 10,000 centistokes at about 25° C, said reaction actually being conducted at a temperature in the range of about 35° C to about 120° C, to which the particulate graft polymer is added and dispersed. The mixture is cast into a suitable mold and allowed to continue to react at a temperature in the range of about 60° C to about 85° C until the clear composition results. In such bulk polymerizations used for preparation of the impact resisting composition of this invention, the various free radical initiators suitable for preparing the required graft polymer are satisfactory which are in turn soluble in the monomers. This would usually and generally exclude the persulfates from being as effective.

The resulting resinous composition or composite prepared by the method of this invention is a clear plastic which can be used generally where clear sheet glass is used and where a clear plastic material is desired which has good impact strength without sacrificing the excellent optical properties typically associated with poly(methyl methacrylate).

The practice of this invention is further illustrated by reference to the following examples which are intended to be representative rather than restrictive of the scope of the invention. Unless otherwise indicated, all parts and percentages are by weight.

EXAMPLE I

A typical graft polymer was prepared according to the following recipe shown in Table 1.

TABLE 1

| Material | Parts | General Range of Parts |
|---|---|---|
| (1) First charge | | |
| Water | 180 | 100–250 |
| Potassium salt of organic phosphate ester (emulsifier) | 4 | 1.5–12 |
| $K_2S_2O_8$ (initiator) | 0.05 | 0.20–0.5 |
| Iron chelator | 0.02 | 0–0.05 |
| (2) Second charge | | |
| 2-ethyl hexyl acrylate | 56.7 | |
| Allyl methacrylate | 0.7 | 0.1–5.0 |
| Styrene | 13.3 | |
| Mercaptan (modifier) | 0.7 | 0.01–5.0 |
| (3) Third charge | | |
| Methyl methacrylate | 30 | |
| Benzoyl peroxide (initiator) | 0.13 | 0.05–0.5 |

This graft polymer was prepared by adding the first charge to the polymerization reactor, followed by the second charge. The resulting mixture was polymerized at 60° C in an inert atmosphere (nitrogen) to give a stable latex of about 29 weight percent polymer. The third charge was then added and polymerized at 60° C to a final solids, or polymer content of about 36 weight percent. The thermoplastic graft polymer was then isolated from the latex by coagulation in an aqueous $MgSO_4$ solution. The coagulated crumb was washed and dried.

EXAMPLE II

The graft polymer prepared according to Example I was alternatively dispersed in methyl methacrylate monomer, a co-monomer mixture thereof and a partially polymerized sirup thereof. It was necessary to use rather vigorous agitation to disperse this graft polymer in the more viscous sirups. Table 2 shows some typical viscosities obtained on these dispersions, compared to the sirup.

TABLE 2

| | Material | Viscosity (Centistokes) |
|---|---|---|
| 1) | Sirup of 15 weight percent polymerized co-monomer | 1100 |
| 2) | Above sirup, containing 7% by weight of a graft polymer from Example I, with 1.0 phr* allyl methacrylate and 2.0 phr tertiary dodecyl mercaptan | 9850 |
| 3) | As in 2, except graft polymer from Example I, with 2.0 phr allyl methacrylate and 2.0 phr tertiary dodecyl mercaptan | 9850 |
| 4) | As in 2, except graft polymer from Example I, with 1.0 phr allyl methacrylate and 3.0 phr tertiary dodecyl mercaptan | 4630 |
| 5) | As in 2, except graft polymer from Example I, with 2.0 phr allyl methacrylate and 3.0 phr tertiary dodecyl mercaptan | 6340 |
| 6) | As in 2, except graft polymer from Example I, with 1.0 phr allyl methacrylate and 5.0 phr tertiary docecyl mercaptan | 3620 |
| 7) | As in 2, except graft polymer from Example I, with 2.0 phr allyl | 4100 |

TABLE 2-continued

| Material | Viscosity (Centistokes) |
|---|---|
| | methacrylate and 5.0 phr tertiary dodecyl mercaptan |
| 8) Methyl methacrylate monomer containing 5 weight percent of a graft polymer prepared according to the method of Example I | 500 |

*phr means parts per 100 parts by weight of graft polymer

EXAMPLE III

To a graft polymer-containing sirup prepared according to Example II was then added about 0.5–1.0 phr of a free radical initiator, for example, Lupersol 11, a 75 percent active solution of tertiary butyl peroxy pivalate. This mixture was poured into a cell type mold, consisting of two polished glass plates sealed on the edge with a rubber gasket. The cell was placed in a 60° C water bath where polymerization could proceed for several hours (2–10 hours) to prepare a transparent sheet. Typical physical properties obtained on such a molding were as follows as shown in Table 3.

TABLE 3

| Composition | Light Transmission (%) | Haze (%) | Gardner Falling Dart Impact (in/lbs) |
|---|---|---|---|
| Polymethyl methacrylate prepared from sirup, as above | 92.8 | 0.5 | 5 |
| Polymethyl methacrylate, containing 3.5% of specially prepared graft polymer, from Example I | 92.8 | 2.6 | 10 |
| Polymethyl methacrylate, containing 7.0% of specially prepared graft polymer, from Example I. | 92.8 | 8.8 | 15 |

In these examples and in the general description of the product of this invention, the Izod Impact Test was ASTM D-256 (plastics) and ASTM D-758 (Plastics at subnormal and elevated temperatures), the flexural modulus was represented by ASTM D-790 (plastics) and ASTM D-797 (elastomers) and the Gardner drop dart impact test was a method for determining energy absorption characteristics of a material subjected to shock loading where a metal ball of known weight was dropped on a sample from regularly increasing heights and the height of drop which produced a failure was reported. The test is generally used for hard metals, ceramics and plastics. The refractive index measurements were made in the presence of ordinary sunlight, or white light, at about 25° C on the molded polymer sheets having a thickness of about 10 mils using an Abbe type refractometer. Light transmission measurements were made with a Gardner color difference meter and the haze measurements were made using a Hazemeter attachment on the Gardner colorimeter. Test pieces were 3×3×⅛ inch sheets having glossy surfaces obtained by molding on glass or chrome plates. All measurements were made at about 23° C. Tensile properties were obtained with an Instron tensiometer with samples being elongated at a rate of about 2 inches/minute. Heat distortion temperature was obtained in flexure using a load of 66 psig on molded bars 5×½×½ inches. The heat distortion temperatures were taken as the temperatures at which test samples had deformed 0.01 inch with a heating rate of 2° C per minute was applied. The hardness measurement was made with the Shore D scale using a durometer where a hardness of 100 corresponds to a ten pound load on a spherical tip of 0.004 inch in radius. The test is made at about 23° C.

EXAMPLE IV

An additional graft polymer was prepared similar to Example I according to the following recipe shown in Table 4.

TABLE 4

| Material | Parts |
|---|---|
| (1) First charge | |
| Water | 200 |
| Potassium salt of organic phosphate ester (emulsifier) | 5 |
| $K_2S_2O_8$ (initiator) | 0.1 |
| (2) Second charge | |
| 2-ethyl hexyl acrylate | 62.5 |
| Allyl methacrylate | 0.77 |
| Styrene | 13.7 |
| Mercaptan (modifier) | 0.77 |
| (3) Third charge | |
| Methyl methacrylate | 22 |
| Benzoyl peroxide (initiator) | 0.5 |
| Tertiary dodecyl mercaptan (modifier) | 0.022 |

This graft polymer was prepared by adding the first charge to the polymerization reactor, followed by the second charge. The resulting mixture was polymerized at 60° C in an inert atmosphere (nitrogen) to give a stable latex of about 29 weight percent polymer. The third charge was then added and polymerized at 60° C to a final solids, or polymer content of about 36 weight percent. The thermoplastic graft polymer was then isolated from the latex by coagulation in an aqueous $MgSO_4$ solution. The coagulated crumb was washed and dried to yield a thermoplastic polymer having a white light refractive index at 26° C of 1.492, closely approximating that of poly(methyl methacrylate), and a glass transition temperature (Tg) of −66° C as determined on a duPont Differential Thermal Analyzer Model 900.

EXAMPLE V

The specially prepared graft polymer from Example IV was dispersed in methyl methacrylate monomer or monomer mixtures at room temperature as shown in Table 5. Viscosity determinations were made using a Gardner Bubble Viscometer.

TABLE 5

| Monomer Ratio | % Impact Modifier | Viscosity (Centistokes) |
|---|---|---|
| 100% methyl methacrylate (MMA) | 5% | 50 |
| 96/4 MMA/ethyl acrylate | 5% | 50 |
| 96/4 MMA/ethyl acrylate | 7% | 70 |
| 96/4 MMA/ethyl acrylate | 10% | 750 |
| 96/4 MMA/ethyl acrylate | 15% | too viscous to test |

While certain representative embodiments and details have been shown for the purpose of illustrating the invention, it will be apparent to those skilled in this art that various modifications and changes may be made therein without departing from the spirit or scope of the invention.

What is claimed is:

1. A method of preparing a composition, characterized by having a white light transmission efficiency in the range of about 85 to about 92 percent, a notched Izod impact strength in the range of about 8 to about 30 in. lbs, a flex modulus in the range of about 200,000 to about 300,000 psi, a Shore D hardness in the range of about 75 to about 85, a tensile strength in the range of about 3000 to about 5000 psi, a haze value in the range of about 2 to about 10 percent and a heat distortion temperature in the range of about 180° to about 220° C. (66 psi), which comprises a solid external dispersant phase and a discrete microdispersed solid internal phase, said external and internal phases having individual white light refractive indices within about 1 percent of each other in the range of about 1.45 to about 1.55 at 23° C., which comprises (A) forming an initial, liquid, external phase dispersant by free radical polymerizing, at a temperature in the range of about 35° to about 85° C., up to about 25 percent and sufficient to form a syrup having a viscosity in the range of about 200 to about 10,000 centistokes at 25° C., a comonomer mixture comprised of about 80 to about 98 weight percent methyl methacrylate and, correspondingly, about 20 to about 2 weight percent of at least one comonomer selected from styrene, vinyl toluene, α-methylstyrene, acrylonitrile and methacrylonitrile, (B) forming a microdispersion by mixing and dispersing with 100 parts by weight of said liquid, external phase dispersant about 2 to about 15 parts by weight of a crosslinked graft polymer having a particle size in the range of about 0.1 to about 10 microns; where said cross-linked graft polymer is the product of free radical copolymerizing a mixture which comprises (1) about 92 to about 99.9 weight percent of a mixture comprised of (a) about 50 to about 99 weight percent of at least one monomer selected from the group consisting of methacrylate, 2-ethyl hexyl acrylate and methyl methacrylate and, correspondingly, (b) about 1 to about 50 weight percent of at least one monomer selected from styrene, α-methylstyrene, acrylonitrile and methacrylonitrile and, correspondingly, (2) about 8 to about 0.1 weight percent of at least one polyfunctional monomer selected from the group consisting of divinylbenzene, allyl methacrylate, glycidyl acrylate, glycidyl methacrylate, triallyl cyanurate, 1,3-butylene dimethacrylate and ethylene glycol dimethacrylate, where in the preparation of the graft polymer, a portion of the acrylate (1-a) is reserved and then added along with additional free radical initiator after the polymerization of the initial monomers (1-a) and (1-b).

2. The composition prepared by the method of claim 1.

* * * * *